US005859757A

United States Patent [19]

Hanafusa et al.

[11] Patent Number: 5,859,757

[45] Date of Patent: Jan. 12, 1999

[54] OUTPUT DRIVING CIRCUIT FOR USE IN DC STABILIZED POWER SUPPLY CIRCUIT

[75] Inventors: Koichi Hanafusa, Kashihara; Akio Nakajima, Kitakatsuragi-gun, both of Japan

[73] Assignee: Sharp Kabushiki Kaisha, Osaka, Japan

[21] Appl. No.: 938,220

[22] Filed: Sep. 26, 1997

[30] Foreign Application Priority Data

Oct. 8, 1996 [JP] Japan .................................... 8-267545

[51] Int. Cl.[6] ....................................................... H02H 3/00

[52] U.S. Cl. .............................. 361/100; 361/18; 361/93; 361/115

[58] Field of Search .............................. 361/100, 93, 115, 361/18, 78, 79

[56] References Cited

U.S. PATENT DOCUMENTS

| | | | |
|---|---|---|---|
| 4,278,930 | 7/1981 | Rogers | 361/93 |
| 4,768,142 | 8/1988 | Pasma | 363/89 |
| 5,210,479 | 5/1993 | Kimura et al. | 361/93 |
| 5,831,471 | 11/1998 | Hanafusa | 327/540 |

FOREIGN PATENT DOCUMENTS

| | | | |
|---|---|---|---|
| 61-122725 | 6/1986 | Japan | G05F 1/56 |
| 5-88765 | 4/1993 | Japan | G05F 1/56 |
| 5-121974 | 5/1993 | Japan | H03F 3/50 |
| 6-335163 | 12/1994 | Japan | H02J 1/00 |

*Primary Examiner*—Jeffrey A. Gaffin
*Assistant Examiner*—Stephen Jackson
*Attorney, Agent, or Firm*—David G. Conlin; William J. Daley, Jr.

[57] ABSTRACT

An output transistor supplies a current based on a drive current to a load. An output voltage is divided by a feedback voltage, and an error amplifier outputs a voltage according to a difference in feedback voltage. Furthermore, the base drive circuit controls a drive current of the output transistor according to an output voltage of the error amplifier. The drive current flows into GND via only the drive current detecting resistor. The short-circuit overcurrent protecting circuit detects an overcurrent based on a terminal based voltage of the drive current detecting resistor, and detects an occurrence of a short circuit by observing a feedback voltage. According to the described arrangement, as the need of the short-circuit detection-use transistor to be biased by the drive current can be eliminated, variations in output voltage of the error amplifier can be suppressed, and improved transient response characteristics can be achieved. As a result, in a drive circuit for use in the DC stabilized power supply circuit provided with the short-circuit overcurrent protecting circuit, improved transient response characteristics can be achieved.

10 Claims, 6 Drawing Sheets

OUTPUT DRIVING CIRCUIT FOR USE IN DC STABILIZED POWER SUPPLY CIRCUIT

FIELD OF THE INVENTION

The present invention relates to an output driving circuit for use in a DC stabilized power supply circuit provided with a short-circuit protecting function and an overcurrent protecting function, more particularly relates to an output driving circuit for use in a DC stabilized power supply circuit which can quickly respond to variations in load.

BACKGROUND OF THE INVENTION

DC stabilization power supply circuits which permit a constant DC voltage to be always applied to a load irrespectively of variations in current consumption of a load or an input voltage of the load have been used in a variety of fields such as a power supply circuit for computers, etc.

As shown in FIG. 6, in a conventional DC stabilized power supply circuit 101, an output transistor 102 supplies a current in accordance with a drive current Id to a load 105. The output voltage $V_{out}$ between the output terminals is divided by a voltage dividing circuit 103, and a feedback voltage $V_{adj}$ is applied to an error amplifier 111.

For example, when an output voltage $V_{out}$ is to be lowered due to an increase in current consumption (load current) of the load 105, the error amplifier 111 compares the feedback voltage $V_{adj}$ with a constant reference voltage $V_{ref}$ to detect a difference. In this case, the error amplifier 111 increases an output voltage VA and instructs a base driving circuit 112 to increase a drive current Id. As a result, a corrector current of the output transistor 102, i.e., an output current $I_{out}$ of the DC stabilized power supply circuit 101 increases to maintain the output voltage $V_{out}$ constant. On the other hand, for example, when an output voltage $V_{out}$ is to increase due to an increase in input voltage $V_{IN}$, the error amplifier 111 lowers an output voltage VA to instruct the base driving circuit 112 to decrease the drive current Id. As a result, an output current $I_{OUT}$ of the DC stabilized power supply circuit 101 decreases to maintain the output voltage $V_{out}$ constant. As a result, the DC stabilized power supply circuit 101 can apply a constant voltage to the load 105 irrespectively of a change in input voltage $V_{IN}$ or a current consumption of the load 105.

The CD stabilized power supply circuit 101 having the described arrangement supplies a current in accordance with the load current to maintain the output voltage $V_{out}$ constant. Therefore, when the load current becomes too large, a damage on the DC stabilized power supply circuit 101 may occur. Therefore, in order to protect the DC stabilized power supply circuit 101 against a supply of an overcurrent, it is required to provide therein a circuit for limiting a maximum value of an output current. Even if the overcurrent protecting function is provided, in an event of a short circuit between the output terminals, the DC stabilized power supply circuit 101 supplies a current as much as possible in order to increase the output voltage $V_{out}$. This causes a problem of overheat between the output terminals which may cause a damage of the DC stabilized power supply circuit 101 as well as peripheral equipments. Therefore, a short-circuit prevention function is inevitable for the DC stabilized power supply circuit 101 to which a high output current is applied.

In the DC stabilized power supply circuit 101, a short-circuit overcurrent protecting section 113 is provided to achieve both of the described functions. For a low-loss DC stabilized power supply circuit 101, in the case of adopting the output transistor 102 and the control-use IC of two chips, the short-circuit overcurrent protecting section 113 detects an overcurrent and a short-circuit not based on the output current $V_{out}$ but based on the drive current Id.

Here, respective structures of the circuits 111 and 113 will be explained in detail. The base driving circuit 112 includes an NPN-type transistor Qill and a NPN-type transistor Q112 which are Darlington connected. The transistor Q111 is arranged such that the base is connected to the output of the error amplifier 111, and the collector is connected to the collector of the output transistor 102. Therefore, the transistor Q112 absorbs a drive current Id in an amount corresponding to an output voltage VA of the error amplifier 111.

The short-circuit overcurrent protecting section 113 includes an NPN-type transistor Q121 and a resistor R121 for detecting a short-circuit and an overcurrent. The base and the collector of the transistor Q121 are mutually connected and are connected to the emitter of the transistor Q112. The emitter of the transistor Q121 is connected to ground via the resistor R121. Between the base and the emitter of the transistor Q121, the resistor R122 is provided for biasing the transistor Q121.

In the DC stabilized power supply circuit 101 having the described arrangement, without an applied load, the output transistor 102 supplies a current only to the voltage dividing circuit 103. In this state, the drive current Id of the output transistor 102 is extremely small (around several tens μA). Therefore, in the short-circuit overcurrent protecting circuit 113, the transistor Q121 is not biased, and the drive current Id flows in the GND via the resistor R122. As a result, in the error amplifier 111, the output voltage VA1 without an applied load is given as around 1.0 V from the following formula (1):

$$\begin{aligned} VA1 &= VBE\,(Q112) + VBE\,(Q111) \\ &= 2VBE. \end{aligned} \tag{1}$$

In the above formula (1), VBE (Q111) and VBE (Q112) are a voltage between the base and emitter of the transistor Q111 and a voltage between the base and the emitter of the transistor Q112 respectively, and the VBE is a voltage between the base and the emitter when both of the above voltages are the same.

On the other hand, when the current consumption of the load 105 (load current $I_{OUT}$) rises, the base driving circuit 112 increases the drive current Id. As a result, the output transistor 102 supplies the load current $I_{OUT}$ to the load 105. In this state, the transistor Q121 is biased, and the drive current Id flows via the transistor Q112. As a result, the output voltage VA2 of the error amplifier 111 is given as around 2.6 V from the following formula:

$$\begin{aligned} VA2 &= VR121 + VBE\,(Q121) + VBE\,(Q112) + VBE\,(Q111) \\ &= 3VBE + VR121. \end{aligned} \tag{2}$$

Here, the VR121 is a terminal based voltage of the resistor R121.

When the load current $V_{out}$ becomes large, the drive current Id increases, and this, in turn, increases the terminal based voltage VR121 of the resistor R121. The short-circuit overcurrent protecting circuit 121 of the short-circuit protecting section 113 observes the terminal based voltage VR121 to detect an overcurrent. When the voltage VR121 exceeds a predetermined value, the short-circuit overcurrent protecting circuit 121 lowers the output voltage VA of the error amplifier 111. As a result, the drive current Id is limited, and the DC stabilized power supply circuit 101 can be protected against an overcurrent.

On the other hand, when short-circuiting the output terminal, the feedback voltage $V_{adj}$ is lowered, and the error amplifier 111 applies a high output voltage VA to the base of the transistor Q111. As a result, the emitter current of the transistor Q111 flows via the resistors R102, R122 and R121, and the terminal based voltage of the resistor R121 becomes higher than that in the conducting state of the transistor Q121. The short-circuit overcurrent protecting circuit 121 observes the terminal based voltage of the resistor R121 for detecting the short-circuit, and when the terminal based voltage exceeds the predetermined value, the short-circuit overcurrent protecting circuit 121 lowers the output voltage VA of the error amplifier 111. As a result, the drive current Id is limited, and the DC stabilized power supply circuit 101 can be protected against the short-circuit.

However, the DC stabilized power supply circuit 101 having the described arrangement has a drawback in that transient response of the output current is low. A delay in the transient response results from charging a phase compensation capacity C101 provided in the error amplifier 111 at a rise from no load to a heavy load.

Specifically, at a rise from no load to heavy load, one end of the phase compensation capacity C 101, i.e., the output voltage VA of a differential amplifier 111 greatly varies as shown by the formulae (1) and (2) by around 1.6 V from around 1.0 V to around 2.6 V. The other end of the phase compensation capacity C101 is substantially constant and is connected to the internal circuit of a differential amplifier A101. Therefore, at a rise from no load to a heavy load, it takes time to charge the phase compensation capacity C101. As a result, a delay in rise occurs before the base driving circuit 112 adjusts the drive current Id, and the voltage between the corrector and emitter of the output transistor 102 increases. As a result, for example, in the case where the output voltage $V_{out}$ is set to 3.3 V, the output voltage $V_{out}$ is lowered by around 0.5 V in a period of around 30 $\mu$s.

As the load 105 of the DC stabilized power supply circuit 101, for example, a CPU (Central Processing Unit) may be adopted. However, for example, in the CPU for use in recent personal computers, in order to achieve a high speed operation, a clock frequency is increased. Additionally, with an increase in the clock frequency, the current consumption also increases. For example, in some updated CPUs, a maximum current consumption reaches around 10 A. In general, in the digital circuit such as CPU, etc., a current consumption rapidly varies in response to an operating state; however, with an increase in maximum current consumption or an increase in clock frequency, larger variations in current consumption occur more abruptly.

In order to meet the described load 105, in the recent DC stabilized power supply circuit 101, regulation transient response characteristics become the key factor. However, in such conventional DC stabilized power supply circuit 101, as a transient response is low, it is difficult to meet the described requirements.

For example, Japanese Unexamined Patent Publication No. 12974/1993 (Tokukaihei 5-121974) discloses a method of increasing a current to be supplied to a load of an operational amplifier according to a power consumption of the operational amplifier applied to a voltage follower circuit. Specifically, a resistor is provided between a power supply terminal and a power supply of the operational amplifier which constitutes a voltage follower circuit. Additionally, to an output of the operational amplifier, transistors for supplying currents in amounts according to the terminal based voltage of the resistor are provided in parallel. According to the described arrangement, due to variations in load voltage of the operational amplifier and variations in power consumption of the operational amplifier, the transistor increases a current to be supplied to the load. As a result, the voltage follower circuit permits a high speed response with respect to variations in load voltage.

However, the described arrangement is designed for the voltage follower circuit in which an output follows an input, and thus cannot be used for the purpose of amplifying an input unlike the error amplifier 111 as shown in FIG. 6. Additionally, even if the drive capacity of the error amplifier 111 is improved, the biased state of the transistor Q121 varies when rising from no load to a heavy load. Therefore, variations in output voltage VA increase, and such problem that a transient response is delayed has not yet been solved.

In order to solve the described problem, various methods have been proposed, for example, as follows: A method (a) wherein a resistance R101 between the base and the emitter of the output transistor 102 is lowered. According to the method (a), to the transistor Q121 of the short-circuit overcurrent protecting section 113, an invalid current is supplied via the resistor 101 from the input voltage $V_{in}$, the transistor Q 121 is biased, and the output voltage VA of the error amplifier 111 increases by a voltage between the base and the emitter of the transistor Q121. As a result, variations in output voltage VA between no load and a heavy load can be suppressed.

However, according to the described method, although transient response characteristics improve, a new problem arises in that a current consumption of the DC stabilized power supply circuit 101 without an applied load increases. As a result, especially in the arrangement where an input voltage $V_{in}$ is applied using batteries like the portable equipments, etc., the batteries are quickly consumed, which results in a shorter operation time of the equipments.

Another method (b) has been proposed wherein a capacity of the phase compensation capacity C101 is reduced. As a result, in the phase compensation capacity C101, even if variations in the terminal based voltage occur, the charging time can be maintained short, thereby achieving improved transient response characteristics of the DC stabilized power supply circuit 101. However, when adopting the method (b), in the error amplifier 111, as a phase margin is reduced, for example, due to variations in ambient temperature, input, etc., the error amplifier 111 may oscillate.

A still another method (c) has been proposed, for example, by Japanese Unexamined Patent Publication No. 122725/1986 (Tokukaisho 61-122725) in which a main adjustment and a fine adjustment are carried out. Specifically, a DC stabilized power supply circuit includes a floating power supply circuit having a first terminal and a second terminal, a first feedback circuit for controlling a potential of the second terminal based on a potential of the first terminal, i.e., an output terminal of the DC stabilized power supply circuit, and a second feedback circuit for controlling the terminal based voltage of the floating power supply circuit. According to the described arrangement, the floating power supply circuit mainly adjusts an output voltage of the DC stabilized power supply circuit by controlling the terminal based voltage. As a result, even when the output voltage varies in a wide range due to variations in load, a change in output voltage can be compensated. On the other hand, as the first feedback circuit controls a potential of the second terminal to apply a fine adjustment to an output voltage of the DC stabilized power supply circuit. As a result, even when a fine transient variation in output voltage occurs, changes in output voltage can be compensated. However, in the described arrangement, separate circuits are required for the main adjustment and fine adjustment, and thus the structure of the DC current stabilized power supply circuit becomes complicated.

As described, in any of the described conventional methods (a) thorough (c), although improved transient response characteristics can be achieved, as the described new problems arise, a complete solution to the above-mentioned problems cannot be achieved.

SUMMARY OF THE INVENTION

It is an object of the present invention to provide an output driving circuit for use in a DC stabilized power supply circuit provided with a short-circuit overcurrent protecting circuit, which offers improved transient response characteristics.

In order to achieve the above object, an output driving circuit for use in a DC stabilized power supply circuit of the present invention is characterized by including: an error amplifier for detecting a difference in output of the DC stabilized power supply circuit; a phase compensation capacity for compensating for a phase of the output, one end of the phase compensation capacity being connected to an output of the error amplifier; control means for controlling a drive current of the output transistor based on an output of the error amplifier to reduce the output difference; a drive current detecting resistor in which the drive current flows; and a short-circuit overcurrent protection means for limiting the drive current when (a) an overcurrent of the output current is detected based on a terminal based voltage of the drive current detection resistor and (b) a short-circuit of the output terminals of the DC stabilized power supply circuit is detected based on a feedback voltage which varies in response to the output of the DC stabilized power supply circuit.

According to the described arrangement, the short-circuit overcurrent protecting circuit detects a short-circuit based on a feedback voltage. This eliminates a need of connecting a short-circuit detection-use transistor in series with the drive current detection resistor to detect a short-circuit without problems. As a result, a short-circuit detection-use transistor in which a biased state varies due to variations in drive current can be omitted from the conventional output driving circuit of the DC stabilized power supply circuit. As a result, when varying from no load to a heavy load, variations in output potential of the error amplifier can be reduced as compared to the conventional arrangement. This permits a shorter charging time of the phase compensation capacity, and the output driving circuit to follow even more abrupt variations in load current than that achieved from the conventional arrangement. As a result, in the output driving circuit of the DC stabilized power supply circuit which can protect the output transistor against a short-circuit and an overcurrent, improved transient characteristics can be achieved.

In the described arrangement, it is preferable that a resistance value of the drive current detection resistor is selected such that the terminal based voltage upon detecting an overcurrent is not more than 0.5 V. The described arrangement permits variations in output potential of the error amplifier due to an increase in drive current to be suppressed, thereby enabling an output driving circuit of the DC stabilized power supply circuit having desirable transient response characteristics.

For the short-circuit overcurrent protecting circuit, various structures have been proposed. For example, it may include a first comparator for detecting a short-circuit by comparing the feedback voltage with the first reference voltage to lower the drive current, and a second comparator for detecting an overcurrent by comparing the terminal based voltage of the drive current detection resistor and the second reference voltage to lower the drive current. However, as the described arrangement requires the first and second comparators and power sources for generating the first and second reference voltages, the circuit structure becomes complicated, and it is difficult to reduce a current consumption.

Therefore, in addition to the described arrangements, it is preferable that the short-circuit overcurrent protecting circuit includes a short-circuit detector for detecting a short-circuit between output terminals based on the feedback voltage, a reference voltage generating circuit for outputting different comparative voltages between a short-circuit period in which the short-circuit detector detects a short-circuit and a non-short-circuit period, and a comparator for detecting an occurrence of a short-circuit and an overcurrent by comparing the terminal based voltage of the drive current detection resistor with the comparative voltage.

According to the described arrangement, a common comparator can be used for a detection of a short-circuit and a detection of an overcurrent. In general, it is required that the comparator controls a larger current compared with other circuits to reduce a drive current. Therefore, with a use of the comparator, a circuit structure of an output driving circuit can be significantly simplified. Additionally, as the reference voltage generation circuit outputs one of the reference voltages, as described in the above-arrangement, a power consumption of the output driving circuit can be reduced as compared with the case where the respective power sources generate two reference voltages. As a result, an output driving circuit for use in the DC stabilized power supply circuit of a simple structure which has a small power consumption can be achieved.

It is also preferable that the reference voltage generating circuit having the described arrangement includes a first resistor, to one end of which, a predetermined reference voltage is applied, a second resistor to be connected to the first resistor in series, a selective transistor to which the reference voltage is applied via the first resistor and the second resistor for conducting and cutting off according to an instruction from the short-circuit detector, and a generating circuit for generating the comparative voltage based on a voltage at a junction between the first resistor and the second resistor.

According to the described arrangement, when the short-circuit detector detects a short-circuit, the selective transistor conducts, and a voltage at a junction between the first and second resistors is almost at a value obtained by dividing the reference voltage by the first and second resistors. As a result, the generating circuit outputs the first comparative voltage determined by the voltage-dividing ratio.

On the other hand, when the short-circuit detector does not detect a short-circuit, the selective transistor cuts off, and the voltage at a junction between the first resistor and the second resistor is maintained at the reference voltage. As a result, the generating circuit outputs the second comparative voltage which is different from the first comparative voltage when a short-circuit is not detected. In this state, as the selective transistor cuts off, a current does not flow in the second resistor. As a result, a power consumption of the reference voltage generating circuit when short-circuiting can be suppressed to the lower level compared with the case of generating two reference voltages only one of which is to be selected.

Therefore, during a non short-circuit detecting period, a power consumption of the reference voltage generating circuit can be reduced. As a result, an output driving circuit of the DC stabilized power supply circuit which permits a reduction in power consumption can be achieved.

The novel features which are considered as characteristic of the invention are set forth in particular in the appended claims. The improved treatment method, as well as the construction and mode of operation of the improved treatment apparatus, will, however, be best understood upon perusal of the following detailed description of certain specific embodiments w hen read in conjunction with the accompanying drawings.

DESCRIPTION OF THE EMBODIMENTS

The following descriptions will explain one embodiment of the present invention in reference to FIG. 1 through FIG. 5. A DC stabilized power supply circuit in accordance with the present embodiment is suitably applied for driving a CPU (Central Processing Unit) of a personal computer subjected to large variations in load current at high frequency.

Figure 1:
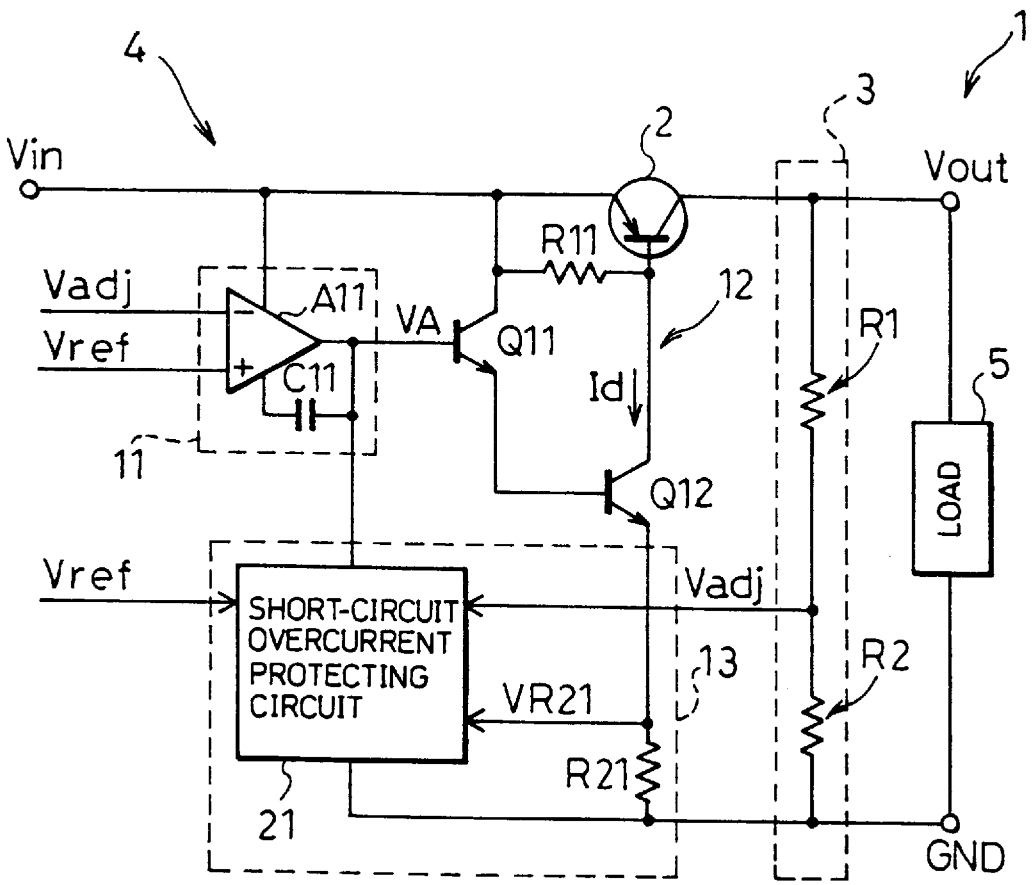
FIG. 1 which shows one embodiment of the present invention is a block diagram showing essential structures of a DC stabilized power supply circuit.
Figure 2:
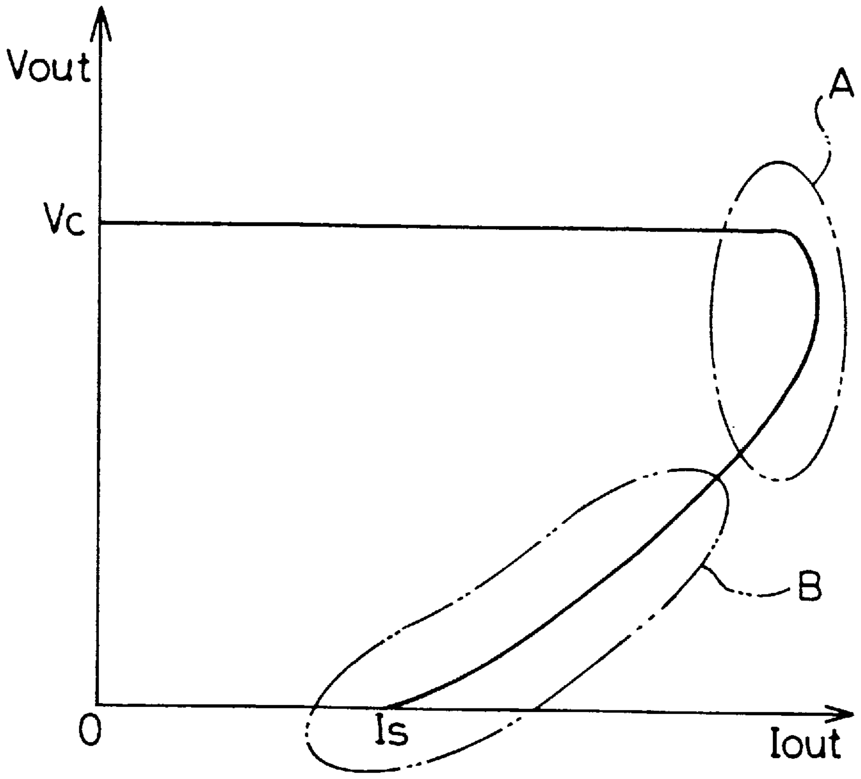
FIG. 2 is a graph showing a relationship between an output Current and an output voltage in the DC stabilized power supply circuit of FIG. 1.

As shown in FIG. 1, a DC stabilized power supply circuit 1 in accordance with the present embodiment includes a PNP-type output transistor 2, a voltage dividing circuit 3 and an output driving circuit 4. The PNP-type output transistor 2 supplies a current as supplied from an input terminal to an output terminal based on a drive current Id. The voltage dividing circuit 3 is composed of resistors R1 and R2 and generates a feedback voltage $V_{adj}$ by dividing an output voltage $V_o$. The output driving circuit 4 is provided for controlling the drive current Id of the PNP-type output transistor 2 to achieve the feedback voltage $V_{adj}$ of a predetermined value. As a result, as shown in FIG. 2, the DC stabilized power supply circuit 1 permits the output voltage $V_{out}$ to be maintained at a constant value $V_c$ without being affected by variations in input voltage $V_{in}$ and the load 5.

As shown in FIG. 1, the output driving circuit 4 includes an error amplifier 11, a base driving circuit 12 (control means) and a short-circuit overcurrent protecting section 13 (short-circuit overcurrent protection means) The error amplifier 11 is provided for outputting a voltage VA in accordance with an error between the feedback voltage $V_{adj}$ and a predetermined reference voltage $V_{ref}$. The base driving circuit 12 is provided for controlling the base drive current Id based on the voltage VA. The short-circuit overcurrent protecting section 13 is provided for protecting the DC stabilized power supply circuit 1 and the load 5 against an overcurrent caused by an overload, and the output terminals are short-circuited.

The error amplifier 11 includes a differential amplifier A11 and a phase compensation capacity C11. To an inverting input terminal of the differential amplifier A11, a feedback voltage $V_{adj}$ as generated from the dividing circuit 3 is applied, while to the non-inverting input terminal, a reference voltage $V_{ref}$ as supplied from the reference voltage generating circuit (not shown) is applied. The phase compensation capacity C11 is provided between an output of the differential amplifier A11 and the power supply of the differential amplifier A11 and compensates for a delay in phase to prevent oscillations due to the delay in phase.

On the other hand, the base driving circuit 12 includes the NPN-type transistor Q11 and the PNP-type transistor Q12 which are Darlington connected. The transistor Q11 is arranged such that the base is connected to an output of the error amplifier 11, and an input voltage $V_{in}$ is applied to the emitter. On the other hand, the collector of the transistor Q12 is connected to the base of the PNP-type output transistor 2. Furthermore, in the base driving circuit 12 in accordance with the present embodiment, the emitter of the transistor Q12 is connected to ground via a drive current detecting resistor R21 of the short-circuit overcurrent protecting section 13. Between the base and the emitter of the PNP-type output transistor 2, provided is a resistor R11. This permits the base driving circuit 12 to control the drive current Id of the PNP-type output transistor 2 based on the output voltage VA of the error amplifier 11.

Further, the short-circuit overcurrent protecting section 13 in accordance with the present embodiment includes the drive current detecting resistor R21 and a short-circuit overcurrent protecting circuit 21. The drive current detection resistor R21 is arranged such that one end of the drive current detecting resistor R21 is connected to the emitter of the transistor Q12, and the other end is connected to ground. The short-circuit overcurrent protecting circuit 21 is provided for detecting a short-circuit or an overcurrent between the output terminals based on the terminal based voltage VR21 of the drive current detecting resistor R21 and the feedback voltage $V_{adj}$. Here, the terminal based voltage indicates a voltage generating across terminals. In FIG. 1, to the short-circuit overcurrent protecting circuit 21, the reference voltage $V_{ref}$ is connected. The reference voltage $V_{ref}$ is used for the purpose of generating the predetermined value to be compared with the terminal based voltage VR21. However, by arranging such that the predetermined value is self generated, or the terminal based voltage VR21 is directly compared with the feedback voltage $V_{adj}$, the need of supplying the reference voltage $V_{ref}$ to the short-circuit overcurrent protecting circuit 21 is eliminated. Namely, any arrangement which permits the short-circuit overcurrent protecting circuit 21 to detect a short-circuit and an overcurrent between the output terminals based on the terminal based voltage VR21 and the feedback voltage $V_{adj}$, would offer the same effects as achieved from the present embodiment.

The short-circuit overcurrent protecting circuit 21 observes the terminal based voltage VR21 of the drive current detecting resistor R21 and lowers the output voltage VA of the error amplifier 11 when the voltage VR21 exceeds the predetermined value. This permits the base driving circuit 12 to reduce the drive current Id of the PNP-type output transistor 2. As a result, the short-circuit overcurrent protecting circuit 21 prevents the PNP-type output transistor 2 from generating an overcurrent by limiting the drive current Id.

The short-circuit overcurrent protecting circuit 21 observes the feedback voltage $V_{adj}$ and reduces the output voltage VA of the error amplifier 11 when the feedback voltage $V_{adj}$ becomes less than the predetermined value. This permits the short-circuit overcurrent protecting circuit 21 to limit the output current $I_{out}$ of the PNP-type output transistor 2 by limiting the drive current Id when short-circuiting. As a result, the DC stabilized power supply circuit 1 and the load 5 can be protected against a short-circuit.

Without an event of a short-circuit and an overcurrent, the feedback voltage $V_{adj}$ is higher than the predetermined value, and the terminal based voltage VR21 of the drive current detecting resistor R21 is lower than the predetermined value. Thus, the short-circuit overcurrent protecting circuit 21 does not particularly control the output voltage VA of the error amplifier 11. As a result, the DC stabilized power supply circuit 1 supplies a current in response to the current consumption of the load 5 at a predetermined voltage $V_c$.

As a result, in the DC stabilized power supply circuit 1, the relationship between the output voltage $V_{out}$ and the output current $I_{out}$ draws a curve as shown in FIG. 2. Specifically, the DC stabilized power supply circuit 1 always applies a constant voltage Vc to the load 5 irrespectively of an output current $I_{out}$. On the other hand, when the power consumption of the load 5 increases, and the output current $I_{out}$ exceeds a predetermined value Im, the supply of the current is stopped, to protect the DC stabilized power supply circuit 1 and the load 5 against an overcurrent (an area indicated by A in the figure). In this case, the output voltage $V_{out}$ gradually reduces. Additionally, the DC stabilized power supply circuit 1 can limit the drive current Id to a predetermined short-circuit current Is when the output voltage $V_{out}$ is significantly below the predetermined value $V_c$ caused by a short-circuit between the output terminals even when the output current $I_{out}$ is lower than the predetermined value Im. As a result, the DC stabilized power supply circuit 1 and the load 5 can be protected against a short-circuit (an area indicated by B in the figure).

Next, transient response characteristics of the DC stabilized power supply circuit 1 at a rise from no load to a heavy load will be explained by comparing them with those of the conventional DC stabilized power supply circuit 101 shown in FIG. 6.

In the conventional DC stabilized power supply circuit 101, a short-circuit detection-use transistor Q121 is connected to the drive current detection resistor R121 in series, and whether or not the transistor Q121 is to be biased is determined depending on whether or not the load is applied. Therefore, at a rise from no load to a heavy load, it is required to increase the output voltage VA of the error amplifier 11 by a voltage between the base and the emitter of the transistor Q121 as shown by the formulae (1) and (2) in addition to changes in both-end voltage VR121 of the drive current detection resistor R121. Furthermore, as a detection of a short-circuit is carried out by conducting/shutting off the transistor Q121, a detection voltage when short-circuiting cannot be set to nor more than the voltage between the base and the emitter of the transistor Q121. Therefore, the detection voltage when detecting an overcurrent cannot be set to the voltage (around 0.7 V) between the base and the emitter of the normal transistor.

In contrast, the short-circuit overcurrent protecting section 13 in accordance with the present embodiment detects a short-circuit based on the feedback voltage $V_{adj}$. This eliminates the need of providing the short-circuit detection-use transistor between the drive current detecting resistor R21 and the transistor Q12 from the conventional arrangement. Therefore, a potential difference (VA-VR21) in the terminal based voltage VR21 of the drive current detecting resistor R21 and the output voltage VA of the error amplifier 11 is given by VBE (Ql1)+VBE (Q12) irrespectively of whether or not a load is applied. As a result, the output voltage VA of the error amplifier 11 is given by the following formula (3).

$$\begin{aligned} VA &= VBE(Q11) + VBE(Q12) + VR21 \\ &= 2VBE + VR21. \end{aligned} \quad (3)$$

In the formula (3), VBE (Q11) and VBE (Q12) are a voltage between the base and the emitter of the transistor Q11 and a voltage between the base and the emitter of the transistor Q12 respectively, and VBE is a voltage between the base and the emitter when both of the above voltages are the same.

Therefore, in the DC stabilized power supply circuit 1 in accordance with the present embodiment, the output voltage VA of the error amplifier 11 is determined roughly based on changes in VR21. As a result, compared with the conventional arrangement, variations in the output voltage VA at a rise can be suppressed. Furthermore, as the short-circuit detection-use transistor is eliminated, the voltage (VR21) when detecting the overcurrent can be set below the voltage between the base and the emitter of the normal transistor, for example, to 0.5 V or below.

Figure 3:
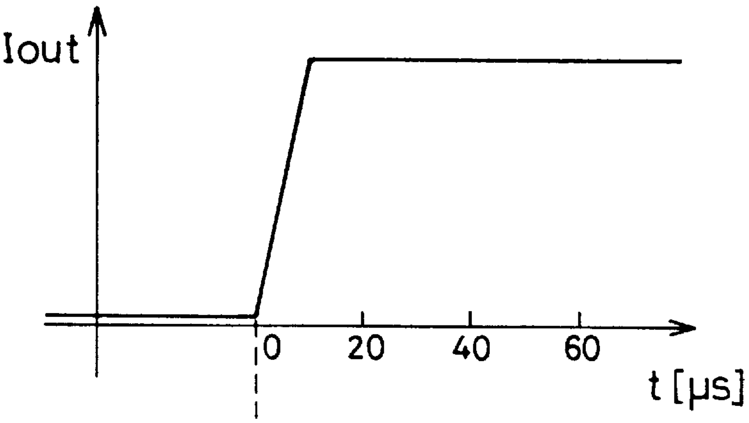
FIG. 3(*a*) through FIG. 3(*c*) are graphs showing transient response characteristics in response to variations in load current in the DC stabilized power supply circuit of FIG. 1.
Figure 3:
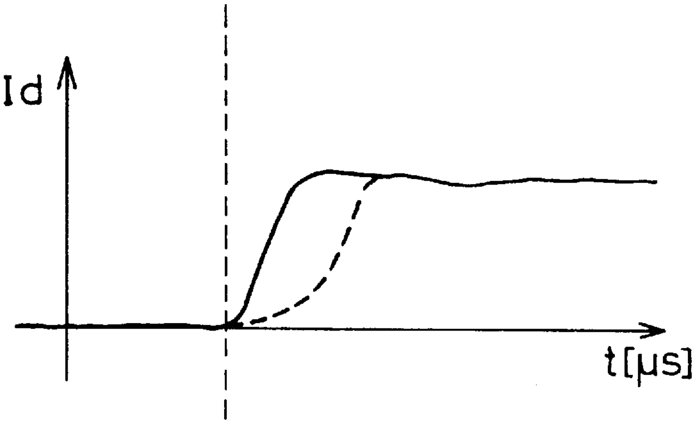
Figure 3:
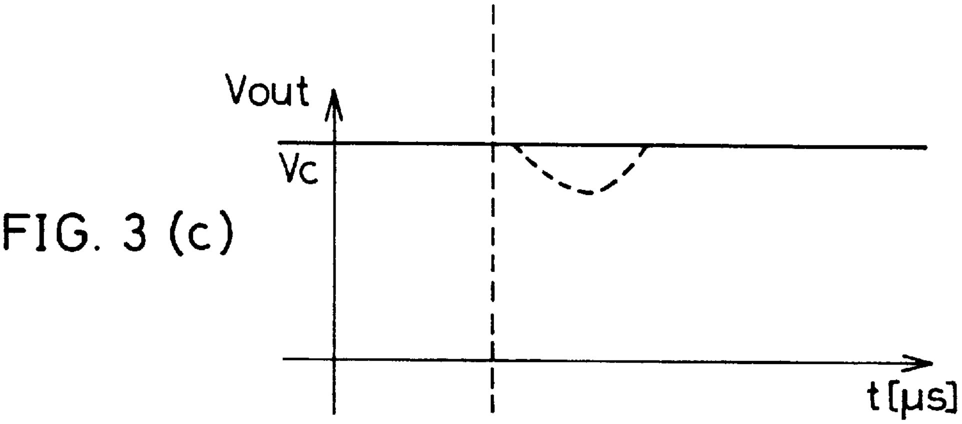

As a result, a shorter time of charging the phase compensation capacity C11 is permitted. Therefore, as shown in FIG. 3(*a*), even when the load current $I_{out}$ of the load 5 rapidly increases, the output voltage VA of the error amplifier 11 can promptly follow the variations in load. As shown in FIG. 3(*b*), the base driving circuit 12 permits a high speed control of the base drive current Id of the PNP-type output transistor 2 as compared to the conventional case shown by a broken line. As a result, as shown in FIG. 3(*c*), the DC stabilized power supply circuit 1 permits a high speed transient response with respect to a change from no load to a heavy load, and thus permits the output voltage $V_o$ to be maintained at a constant value $V_c$.

Figure 6:
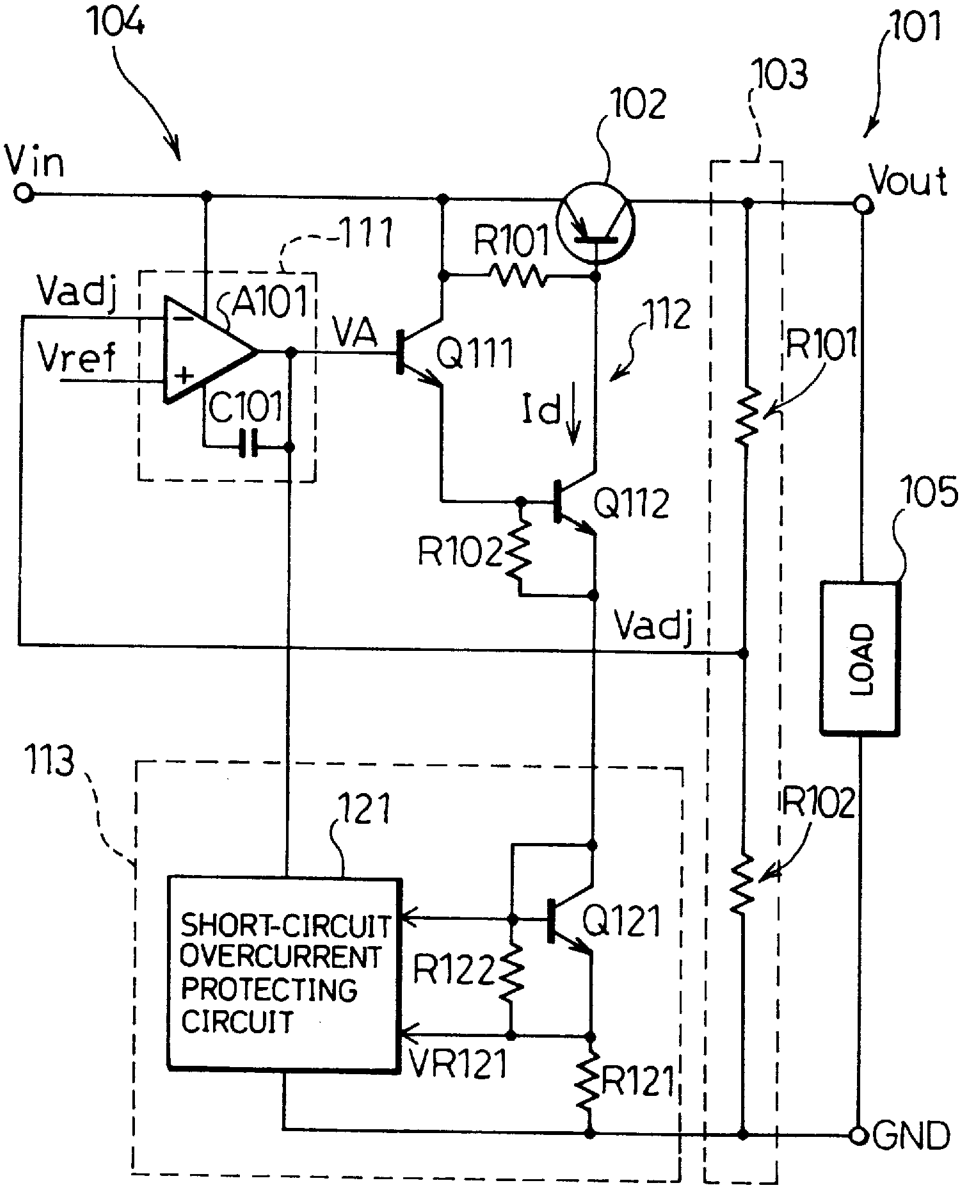
FIG. 6 which shows prior art is a block diagram showing an essential structure of the DC stabilized power supply circuit.

As described, in the conventional arrangement, as a method of enabling a high speed response to be adopted in the DC stabilized power supply circuit 101 shown in FIG. 6, a first method of lowering a resistance value of the resistor R101 between the base and the emitter of the output transistor 102 or a second method of reducing a capacity of the phase compensation capacity C101 of the error amplifier 111 have been proposed. However, in the first method, a new problem arises in that the current consumption increases by an invalid current. On the other hand, when adopting the second method, the error amplifier 111 is likely to oscillate due to a reduction in phase margin, which may unable a stable supply to the load 105. Therefore, in the low-loss type DC stabilized power supply circuit 101, it is difficult to adopt both of the first and second methods.

In contrast, in the DC stabilized power supply circuit 1 in accordance with the present embodiment, the charging time for the phase compensation capacity C11 can be reduced while maintaining the resistor R1 and the phase compensation capacity C11 at conventional levels. Therefore, without an applied load, the invalid current is not generated in the drive current Id, and the current consumption of the DC stabilized power supply circuit 11 can be maintained at the conventional level. Moreover, as the phase margin for the error amplifier 11 can be maintained at the conventional level, oscillation of the error amplifier 11 can be suppressed without being affected by changes in ambient temperature and input voltage $V_{in}$. Therefore, a high speed transient response can be achieved while maintaining the stability and the current consumption of the DC stabilized power supply circuit at conventional levels.

However, in the DC stabilized power supply circuit 1 in accordance with the present embodiment, as shown by the formula (3), a rise in potential VA without an applied load is caused mostly by an increase in the terminal based voltage VR21 of the drive current detecting resistor R21. Therefore, by reducing the resistance value of the drive current detecting resistor R21, changes in potential of VA can be further suppressed. Specifically, it is preferable to set the resistance value of the drive current detecting resistor R21 to be not more than 0.5 V. As a result, the charging time for the phase compensation-use capacity C11 is reduced, thereby permitting a still higher speed transient response.

The structure of the short-circuit overcurrent protecting circuit 21 will be explained in detail in reference to the circuit diagram of FIG. 4. For convenience in explanations, members having the same function as those shown in FIG. 1 will be designated by the same reference numerals, and thus the descriptions thereof shall be omitted here.

Namely, the short-circuit overcurrent protecting circuit 21 in accordance with the present embodiment includes a short-circuit detector 31, a reference voltage generating circuit (reference voltage generating means) 32 and a comparator (comparison means) 33. The short-circuit detector 31 is provided for detecting a short-circuit between the output terminals by observing the feedback voltage $V_{adj}$. The reference voltage generating circuit 32 is provided for generating a comparative voltage $V_s$ which varies between a state where a short circuit occurs and a state where a short circuit does not occur. The comparator 33 is provided for comparing the terminal based voltage VR21 of the drive current detecting resistor R21 with the reference voltage $V_s$.

The short-circuit detector 31 includes a PNP-type transistor Q31 which conducts when short-circuiting. To the base of the PNP-type transistor Q31, a feedback voltage $V_{adj}$ is applied via an NPN-type transistor Q32. Specifically, the NPN-type transistor Q32 is arranged such that the base and the collector are connected to the base of the PNP-type transistor Q31, and the emitter is connected to a junction between the resistor R1 and the resistor R2 which are provided in the voltage-dividing circuit 3. On the other hand, the emitter of the PNP-type transistor Q31 is connected to the base of a transistor Q33 provided between the transistor Q11 and the transistor Q12 of the base driving circuit 12 via the resistor R31. The NPN-type transistor Q33 is arranged such that the base and the collector are connected to the emitter of the transistor Q11, and the emitter is connected to the base of the transistor Q12. Additionally, the collector of the PNP-type transistor Q31 is connected to ground via an NPN-type transistor Q34 wherein the base and the collector are mutually connected. The base of the transistor Q34 is connected to the reference voltage generating circuit 32. This permits the short-circuit detector 31 to inform an occurrence of the short-circuit to the reference voltage generating circuit 32 in a form of changes in base potential $V_x$ of the transistor Q34.

Therefore, operations of each part of the DC stabilized power supply circuit 1 having the described arrangement will be explained. In the case where the output terminals of the DC stabilizing circuit 1 are short-circuited, the output voltage $V_{out}$ is lowered, and the feedback voltage $V_{adj}$ which divides and generates the output voltage $V_{out}$ is also lowered. Here, in the short-circuit detector 31, the NPN-type transistor Q32 conducts which in turn conducts the PNP-type transistor Q31. As a result, a current is supplied to the transistor Q34 from the emitter of the transistor Q11 via the resistor R31 and the PNP-type transistor Q31. As a result, the base potential $V_x$ of the transistor Q34 varies to inform the occurrence of a short-circuit to the reference voltage generating circuit 32.

When the reference voltage generating circuit 32 is informed of an occurrence of a short-circuit by the short-circuit detector 31, the reference voltage generating circuit 32 outputs as a reference voltage $V_s$, a first value $V_{s1}$ which is set based on the output current Is when short-circuiting. This value $V_{s1}$ is set to the terminal based voltage VR21 of the drive current detection resistor R21 when short-circuiting. Further, the comparator 33 absorbs the output current of the error amplifier 11 when the terminal based voltage VR21 is larger than the reference voltage $V_{s1}$ as a result of comparison between them.

In the base driving circuit 12, as the base current of the transistor Q11 is reduced, the drive current Id of the PNP-type output transistor 2 is suppressed. As a result, while the short-circuit detector 31 detects a short-circuit (an area indicated by B in FIG. 2), the DC stabilized power supply circuit 1 can limit the output current $I_{out}$ to $I_s$.

On the other hand, when the output terminals are not short-circuited, the DC stabilized power supply circuit 1 controls the drive current Id of the PNP-type output transistor 2 so to set the output voltage $V_{out}$ to the predetermined value $V_c$. Therefore, irrespectively of the current consumption of the load 5, the feedback voltage $V_{adj}$ coincides with the reference voltage $V_{ref}$. In this state, as the feedback voltage $V_{adj}$ is high, the NPN-type transistor Q32 cannot conduct, and the PNP-type transistor Q31 cuts off. As a result, the base potential $V_x$ of the transistor Q34 is maintained low.

In this state, as the PNP-type transistor Q31 cuts off, the current flowing from the transistor Q11 via the short-circuit detector 31 is extremely small. Therefore, the power consumption of the short-circuit detector 31 in the state where the short-circuit is not detected can be suppressed to an extremely low level.

Further, the reference voltage generating circuit 32 determines that the output terminals are not short-circuited based on the base potential $V_x$ of the transistor Q34. Therefore, the reference voltage generating circuit 32 outputs the second voltage $V_{s2}$ as a reference voltage $V_s$ The second voltage $V_{s2}$ is determined based on the maximum value Im for the output current $I_{out}$ of the PNP-type output transistor 2. Specifically, the second value Vs2 is set to coincide with the terminal based voltage VR21 of the drive current detection resistor R21 under a supplied maximum current.

In this state, as the PNP-type transistor Q31 cuts off, the emitter current of the transistor Q11 is sent to the base of the transistor Q12 via the transistor Q33 to form a Darlington connection. As a result, the base driving circuit 12 controls the drive current Id of the PNP-type output transistor 2 based on the output voltage VA of the error amplifier 11.

Furthermore, when the terminal voltage VR21 is larger than the reference voltage VR2 as a result of comparison between them, the comparator 33 absorbs an output current of the error amplifier 11. As a result, in the base driving circuit 12, as the base current of the transistor Q11 reduces, the drive current Id of the PNP-type output transistor 2 is limited. As a result, when the short-circuit of the short-circuit detector 31 is not detected, the DC stabilized power supply circuit 1 limits the output current $I_{out}$ to not more than Im (an area indicated by A in FIG. 2).

In the short-circuit detector 31 having the described arrangement, as a collector current supply-use transistor Q33 is provided between the transistor Q11 and the transistor Q12 of the base driving circuit 12, the output voltage of the error amplifier 11 increases by VBE of the transistor Q33 from the formula (3). However, irrespectively of an amount of the drive current Id, the transistor Q33 is always biased. Therefore, when rising from no load to a heavy load, the output voltage VA of the error amplifier 11 is not varied. Additionally, the transistor Q33 is biased by the transistor Q11 of the base driving circuit 12. As a result, a generation of invalid current can be prevented without increasing the drive current Id to bias the transistor Q33.

Figure 4:
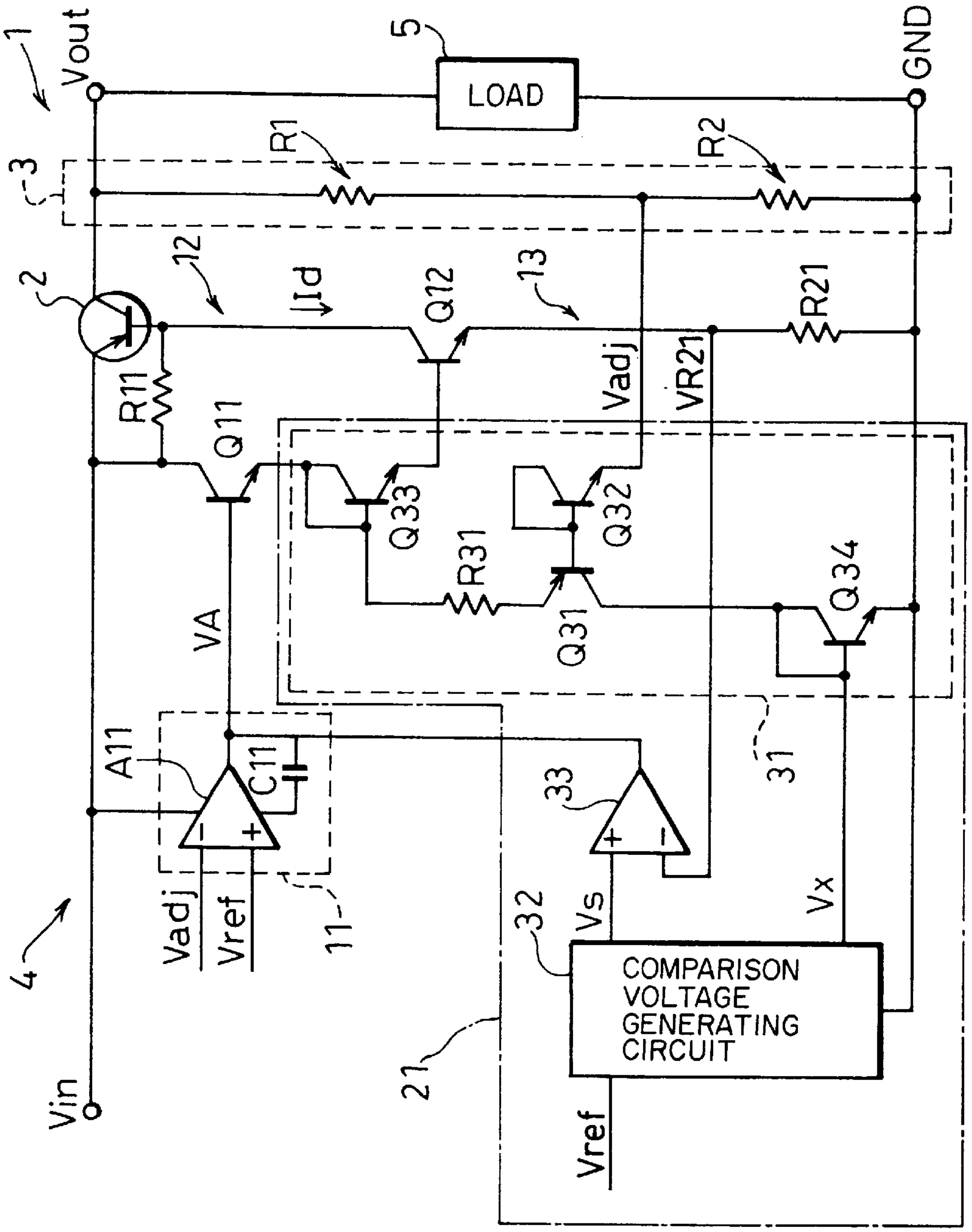
FIG. 4 is a circuit diagram which shows a short-circuit overcurrent protecting circuit in detail in the DC stabilized power supply circuit.

The short-circuit overcurrent protecting circuit 21 shown in FIG. 4 is merely an example of the structure of the present invention, and thus the present invention is not limited to this. For example, for the short-circuit overcurrent protecting circuit 21, a first comparator for comparing the feedback voltage $V_{adj}$ with the predetermined value, a first control circuit for lowering the output voltage VA of the error amplifier 11 based on the result of comparison, a second comparator for comparing the terminal based voltage VR21 of the drive current detecting resistor R21 with the predetermined value, and a second control circuit for controlling the output voltage VA based on the result of comparison, etc., may be adopted. Namely, any short-circuit overcurrent protecting circuit which can detect a short-circuit and an overcurrent based on the terminal based voltage VR21 with the feedback voltage $V_{adj}$ would offer the same effects as achieved from the arrangement of the present embodiment.

According to the described structure, however, controls circuit and comparators are required at least two for each, and thus the structures thereof are likely to be complicated. Furthermore, the short-circuit detection use circuit and the overcurrent detection use circuit are mutually independent, and in order to accurately detect the short-circuit and the overcurrent, it is required to improve respective circuit precision.

In contrast, according to the structure shown in FIG. 4, the comparator 33 can be used in common for a detection of a short-circuit and a detection of an overcurrent. As a result, compared with the case of providing the respective circuits independently, a simplified structure can be achieved. Furthermore, both when detecting a short-circuit and an overcurrent, it is determined if the output voltage VA of the error amplifier 11 is lowered as a result of comparison between the terminal based voltage VR21 and the reference voltage Vs. Therefore, even when adopting the short-circuit detector 31 of low precision, if the reference voltage generating circuit 32 and the comparator 33 have high precision, a short-circuit can be detected with an improved precision. As a result, an improved precision can be achieved with ease compared with the case of separately providing a detecting circuit for use in detecting a short-circuit and a detecting circuit for use in detecting an overcurrent.

In the short-current overcurrent protecting circuit 21 in accordance with the present embodiment, in response to an instruction from the short-circuit detector 31, a reference voltage $V_s$ which serves as a threshold value when detecting an abnormality of the drive current Id is altered. Therefore, when detecting the short-circuit, the short-circuit overcurrent protecting circuit 21 compares the terminal based voltage VR21 of the drive current detection resistor R21 not with the second value $V_{s2}$ but with the first value $V_{s1}$ of the reference voltage. However, as the first value $V_{s1}$ is set lower than the second value $V_{s2}$, the short-circuit overcurrent protecting circuit 21 can protect the DC stabilized power supply circuit 1 even when the drive current Id flows in a greater amount than that indicated by the second value $V_{s2}$.

As the structures of altering the operation of the protective circuit, the DC stabilizing power supply as disclosed in Japanese Unexamined Patent Publication No. 88765/1993 (Tokukaihei 5-88765) and a high frequency power supply as disclosed in Japanese Unexamined Patent Publication No. 335163/1994 (Tokukaihei 6-335163) have been proposed. The former DC stabilizing power supply stops an operation of the overcurrent protecting circuit at a rise of the input voltage to achieve a stable operation of the DC stabilizing power supply at a rise of the input voltage. On the other hand, the latter high frequency power supply stops an operation of the protecting circuit when a rate of variations of the overcurrent exceeds a predetermined value. As a result, the high frequency power supply determines if the device is damaged due to variations in load current, and activates the protecting circuit only when the device is damaged. These power supplies greatly differ in the conditions of altering the operation of the protective circuit and in that the operation of the protective circuit is stopped when the above condition is satisfied. Therefore, when adopting these conventional power supplies, an improved transient response of the DC stabilized power supply circuit 1 as achieved from the arrangement of the present embodiment cannot be achieved.

Figure 5:
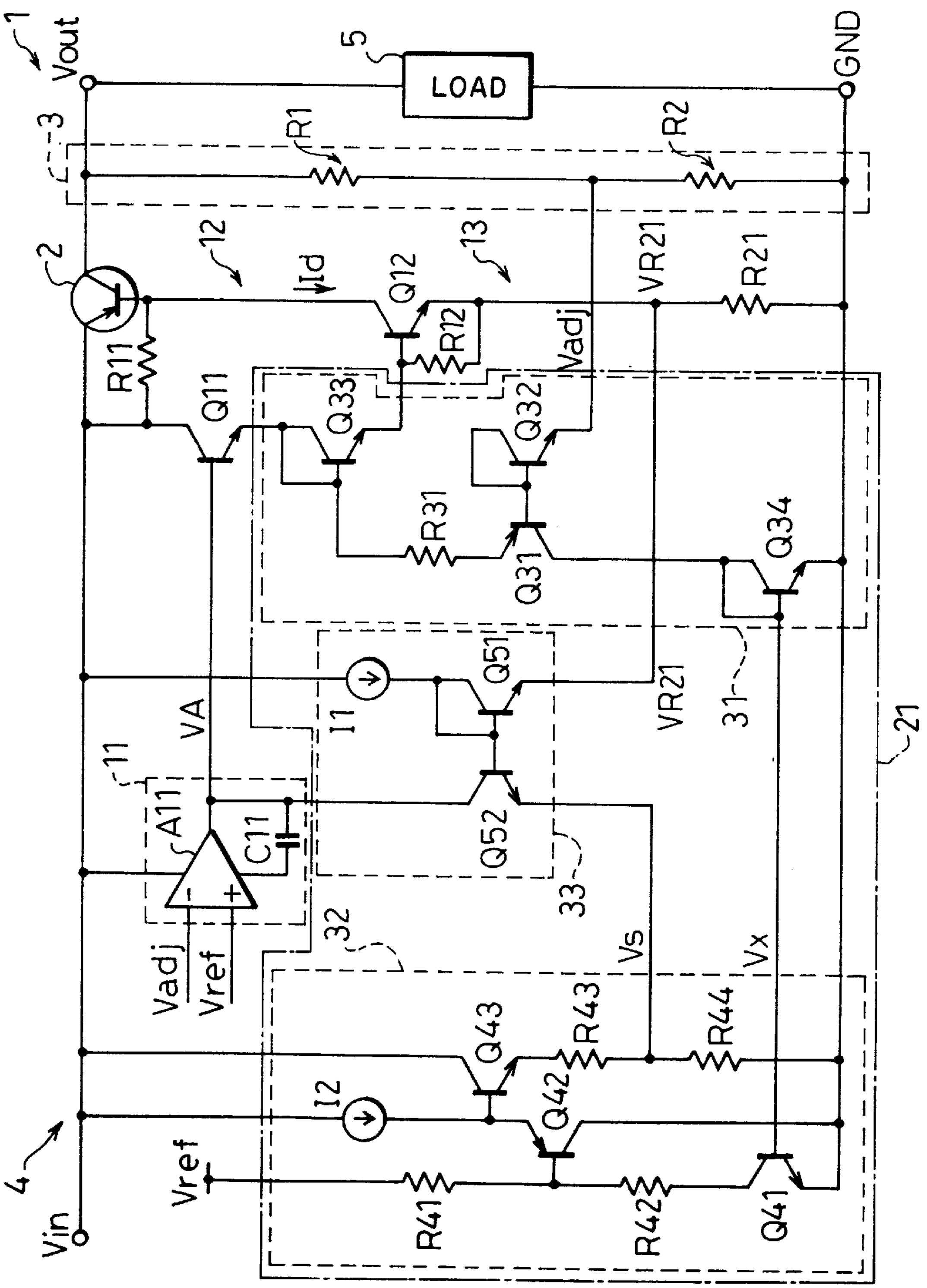
FIG. 5 is a circuit diagram which shows a reference voltage generating circuit in detail in the short-circuit overcurrent protecting circuit of FIG. 4.

The respective structures of the reference voltage generating circuit 32 and the comparator 33 will be explained in reference to FIG. 5. FIG. 5 shows the respective structures of the members 32 and 33, and other members have the same arrangements as those shown FIG. 4 except for that a resistor R12 is provided between the base and the emitter of the transistor Q12 in the base driving circuit 12. Here, members having the same function as those shown in FIG. 1 or FIG. 4 will be designated by the same reference numerals, and thus the descriptions thereof shall be omitted here.

Namely, the reference voltage generating circuit 32 includes the NPN-type transistor Q41 which conducts when a short-circuit is detected by the short-circuit detector 31. The transistor Q41 is arranged such that the base is connected to the base of the transistor Q34 of the short-circuit detector 31, and to the collector, a current is supplied from the reference voltage $V_{ref}$ via the resistor R41 and the resistor R42. The emitter is connected to ground. Additionally, in the reference voltage generating circuit 32, at a junction between the resistors R41 and R42, the base of an PNP-type transistor Q42 is connected. To the emitter of the transistor Q42, a predetermined current is supplied from the constant current supply I2, and the collector is connected to ground. The emitter of the transistor Q42 is connected to the base of the NPN-type transistor Q43. To the collector of the transistor Q43, an input voltage $V_{in}$ is applied, and the emitter is connected to ground via the resistors R43 and R44 which are connected in series.

Here, the transistor Q41 corresponds to the selective transistor in claims, and the resistors R41 and R42 correspond to the first and second resistors in claims. The resistors R43 and R44, the constant current apply I2 and the transistors Q42 and Q43 correspond to generating means.

According to the described arrangement, when a short-circuit is detected by the short-circuit detector 31, the base potential $V_x$ of the transistor Q34 increases, and the transistor Q41 conducts. As a result, the collector terminal voltage of the transistor Q41 becomes almost a saturation voltage $VCE_{sat}$ (Q41). Thus, the base potential VB (Q42) of the transistor Q42 is given from the formula (4):

$$VB\ (Q42)=(V_{ref}-VCE_{sat}(Q41))\times(R42/(R41+R42)) \quad (4).$$

The output voltage $V_{s1}$ of the reference voltage generating circuit 32 upon detecting a short-circuit is given by the following formula (5), $$V_{s1} = (Vref - VCE_{sat}(Q41)) \times (R42/(R41+R42)) \times (R44/(R43+R44)). \quad (5)$$

On the other hand, while the short-circuit detector 31 does not detect a short-circuit, the base potential $V_x$ of the transistor Q34 is maintained at low value. Therefore, the transistor Q41 cuts off, and the base potential of the transistor Q42 is selected to be the reference voltage $V_{ref}$. As a result, the output voltage $V_{s2}$ of the reference voltage generating circuit 32 is given by the following formula (6), $$V_{s2}=V_{ref}\times(R44/(R33+R44)) \quad (6).$$

As a result, the reference voltage generating circuit 32 having the described arrangement outputs a reference voltage $V_{s1}$ when a short circuit occurs, while outputs a reference voltage $V_{s2}$ when a short-circuit does not occur. Additionally, respective resistance values of the resistors R41 through R44 are selected to achieve desirable values for the respective reference voltages $V_{s1}$ and $V_{s2}$.

The comparator 33 includes the NPN-type transistors Q51 and Q52 wherein respective bases are mutually connected. The transistor Q51 is arranged such that the collector and the base are connected, and to the collector, a predetermined current is supplied from a constant current supply I1. Furthermore, the emitter of the transistor Q51 is connected to one end of the drive current detection resistor R21 of the short-circuit overcurrent protecting section 13, to which the terminal based voltage VR21 is applied. Additionally, to the emitter of the transistor Q52, from a junction between the resistor R43 and the resistor R44 of the reference voltage generating circuit 32, a reference voltage $V_s$ is applied. Furthermore, the collector of the transistor Q52 is connected to the output of the error amplifier 11. As a result, the comparator 33 can absorb the current according to a difference between the reference voltage $V_s$ and the terminal based voltage VR21 from the error amplifier 11.

FIG. 5 merely shows example structures for the reference current generating circuit 32 and the comparator 33, and the present invention is not limited to these arrangements. For example, the reference voltage generating circuit 32 separately generates the reference voltage $V_{s1}$ when a short-circuit occurs and the reference voltage $V_{s2}$ when a short-circuit does not conduct. Any arrangement where the comparator 33 lowers the output voltage VA of the error amplifier 11 when the terminal based voltage VR21 of the drive current detecting resistor R21 exceeds the reference voltage $V_s$ would offer the same effect as achieved from the present embodiment.

In the reference voltage generating circuit 32 shown in FIG. 5, the resistor R41, the resistor R42 and the transistor Q41 which conduct/cut off in response to an instruction from the short-circuit detector 31 are connected in series. Furthermore, the generating means, which is composed of the constant current supply I2, the resistors R43 and R44 and the transistors Q42 and Q43, outputs a reference voltage $V_s$ based on a voltage at a junction between the resistors R41 and R42. As a result, as indicated in the formulae (5) and (6), the reference voltage generating circuit 32 generates different voltages $V_{s1}$ and $V_{s2}$ between a state where a shirt-circuit occurs and a state a short-circuit does not occur.

According to the described arrangement, when a short-circuit does not occur, as the transistor Q41 does not occur, a current does not flow in the resistor R42. Therefore, compared with the case of separately generating the reference voltages $V_{s1}$ and $V_{s2}$, a power consumption of the reference voltage generating circuit 32 can be suppressed.

As described, the first output driving circuit (4) of the present invention is an output driving circuit for use in the DC stabilized power supply circuit (1) and includes an error amplifier (11) for detecting a difference in output voltage, a phase compensation capacity (C11) for compensating for an output phase, one end thereof being connected to an output of the error amplifier, a control circuit (base driving circuit 12) for controlling the drive current of the output transistor (2) provided between the input/output terminals of the DC stabilized power supply circuit based on the output of the error amplifier, and a short-circuit overcurrent protecting circuit (21) for limiting the drive current when the output transistor is to supply the overcurrent and when the output terminals are short-circuited. The first output driving circuit (4) is characterized in that an overcurrent is detected based on the terminal based voltage of the drive current detection resistor (R21) in which a drive current flows, and the short-circuit is detected based on the feedback voltage which varies in response to the output voltage.

According to the described arrangement, in a normal operation in which both of the short-circuit and an overcurrent do not occur, the control circuit controls the drive current of the output transistor to reduce an error of the output voltage. As the current consumption of the load increases, the output voltage is lowered. The error amplifier detects a drop in output voltage, and the control circuit increases the drive current. As a result, the DC stabilized power supply circuit can output a constant DC voltage from the output terminal without being affected by variations in load.

As the current consumption of the load increases, the control circuit increases the drive current. As a result, the terminal based voltage of the drive current detection resistor increases. When the terminal based voltage increases and exceeds a predetermined value, the short-circuit overcurrent protecting circuit lowers the drive current, for example, by giving an instruction to lower the drive current to the control circuit. As a result, the output transistor can be protected against an overcurrent.

The short-circuit overcurrent protecting circuit determines if a short-circuit occurs, for example, by observing the feedback voltage generated by dividing the output voltage. When the output terminals are short-circuited, the output voltage is lowered, and the feedback voltage is also lowered. In this case, the short-circuit overcurrent protecting circuit limits the drive current when generating the overcurrent. As a result, the output current can be limited even when the output terminals are short-circuited.

Like the conventional arrangement, when connecting the short-circuit detection-use transistor connected with the drive current detection resistor in series, depending on an amount of the drive current (an amount of a load current), the bias-voltage of the short-circuit detection use transistor is varied, which results in large variations in the output potential of the error amplifier. As a result, in the conventional output driving circuit, when the load current is abruptly raised, a delay in rise in the drive current occurs by charging the phase compensation-use capacity. This delay in transient response causes a drop in output voltage in the DC stabilized power supply circuit.

In contrast, according to the structure of the first output driving circuit, the short-circuit overcurrent protecting circuit detects a short-circuit based on the feedback voltage. As a result, without connecting the short-circuit detection-use transistor to the drive current detection resistor in series like the conventional arrangement, a short-circuit can be detected without problems. This permits the short-circuit detection-use transistor whose biased state varies in response to variations in drive current to be eliminated from the conventional output driving circuit of the DC stabilized power supply circuit. As a result, when varying from no load to a heavy load, variations in output potential of the error amplifier can be reduced as compared to that achieved from the conventional arrangement. As this permits a shorter charging time of the phase compensation capacity, the output driving circuit can follow even more abrupt variations than the conventional arrangement. As a result, in the output driving circuit for use in DC stabilized power supply circuit which permits the output transistor to be protected against a short-circuit and an overcurrent, improved transient response characteristics can be achieved.

The second output driving circuit of the present invention based on the first output driving circuit is characterized in that a resistance value of the drive current detection resistor is selected such that the terminal based voltage when detecting an overcurrent is not more than 0.5 V.

According to the described arrangement, variations in output potential of the error amplifier due to an increase in drive current can be suppressed. As a result, variations in output potential of the error amplifier at a rise from no load to a heavy load can be further reduced, thereby achieving an output driving circuit of the DC stabilized power supply circuit having still more desirable transient response characteristics.

For the short-circuit overcurrent protecting circuit, various structures have been proposed. For example, the short-circuit overcurrent protecting circuit includes a first comparator for detecting a short-circuit by comparing the feedback voltage with a first reference voltage and lowering the drive current, and a second comparator for detecting an overcurrent by comparing the terminal based voltage with a second reference voltage of the drive current detection resistor. However, as the described arrangement requires the first and second comparators, and a power supply for generating the first and second reference voltage, a circuit structure becomes complicated, and a current consumption is difficult to be reduced.

In contrast, the third output driving circuit in accordance with the present invention based on the first or second output driving circuit is characterized in that the short-circuit overcurrent protecting circuit includes a short-circuit detector (31) for detecting a short-circuit between the output terminals, a reference voltage generating circuit (32) for outputting reference voltage of different values between a short-circuit period in which the short-circuit detector detects a short-circuit and a non-short-circuit period, and a comparator (33) for comparing the terminal based voltage of the drive current detection resistor with the reference voltage to detect a short circuit and an overcurrent by comparing.

According to the described arrangement, a common comparator can be used for a detection of a short-circuit and a detection of an overcurrent. In order to reduce the drive current, the comparator is required to suppress a larger current compared with other circuit. With a common use of the comparator, the circuit structure of the output driving circuit can be significantly simplified. Additionally, as the reference voltage generating circuit outputs one of the reference voltages, like the aforementioned arrangement, a power consumption of the output driving circuit can be significantly reduced compared with the case where different reference voltages are generated from separately provided power supplies. As a result, an output driving circuit of a DC stabilized power supply circuit which permits a simple structure and a small power consumption can be achieved. The fourth output driving circuit of the present invention based on the third output driving circuit is characterized in that the reference voltage generating circuit includes a first resistor (R41) to one end of which, a predetermined reference voltage is applied, the second resistor (R42) to be connected with the first resistor in series, a selective transistor (Q41) to which the reference voltage is applied via the first and second resistors, for conducting and cutting off in accordance with an instruction from the short-circuit detector, and a generating circuit (R32·R44) for generating a reference voltage based on a voltage at a junction between the first resistor and the second resistor.

According to the described arrangement, when the short-circuit detector detects a short-circuit, the selective transistor conducts, and a voltage at a junction between the first and second resistors becomes values obtained by dividing the reference voltage by the first and second resistors. As a result, the generating circuit outputs the first comparative voltage which is determined based on the voltage dividing ratio.

On the other hand, during the period in which the short-circuit detector does not detect a short-circuit, the selective transistor cuts off, and a voltage at a junction between the first resistor and the second resistor is maintained at the reference voltage. As a result, the generating circuit outputs the second reference voltage different from the first comparative voltage when not short-circuiting. In this state, as the selective transistor cuts off, a current does not flow into the second resistor. As a result, a power consumption of the reference voltage generating circuit when not short-circuiting can be suppressed to a lower level compared with the case of generating two comparative voltages only one of which is to be selected. According to the described arrangement, when not short-circuiting, the power consumption of the reference voltage generating circuit can be reduced. As a result, an output driving circuit for use in the DC stabilized power supply circuit which consumes a small amount of power can be achieved.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. An output driving circuit for use in a DC stabilized power supply circuit for controlling an output transistor provided between an input terminal and an output terminal of said DC stabilized power supply circuit, comprising:

an error amplifier for detecting a difference in output of said DC stabilized power supply circuit;

a phase compensation capacity for compensating for a phase of the output, one end of said phase compensation capacity being connected to an output of said error amplifier;

control means for controlling a drive current of said output transistor based on an output of said error amplifier to reduce the output difference;

a drive current detecting resistor in which the drive current flows; and a short-circuit overcurrent protection means for limiting the drive current when (a) an overcurrent of the output current is detected based on a terminal based voltage of the drive current detection resistor and (b) a short-circuit of the output terminals of the DC stabilized power supply circuit is detected based on a feedback voltage which varies in response to an output of the DC stabilized power supply circuit.

2. The output driving circuit for use in a DC stabilized power supply circuit as set forth in claim 1, wherein:

said short-circuit overcurrent detection means limits the drive current when a short-circuit occurs based on both the feedback voltage and the terminal based voltage.

3. The output driving circuit for use in a DC stabilized power supply circuit as set forth in claim 2, wherein said short-circuit overcurrent protection means includes:

a short-circuit detector for detecting a short-circuit between the output terminals based on the feedback voltage;

reference voltage generating means for altering a value of the reference voltage to be generated between a short-circuit period in which said short-circuit detector carries out a detection of said short-circuit and a non-short-circuit detection period; and comparison means for comparing the terminal based voltage of said drive current detecting resistor with the reference voltage to detect an occurrence of a short-circuit and an overcurrent and reducing the drive current upon detecting the short-circuit or the overcurrent.

4. The output driving circuit for use in a DC stabilized power supply circuit as set forth in claim 3, wherein said reference voltage generating means includes:

a first resistor to one end of which a predetermined reference voltage is applied;

a second resistor to be connected to said first resistor in series;

a selective transistor to which the reference voltage is applied via said first resistor and said second resistor, said selective transistor conducting and cutting off in accordance with an instruction from said short-circuit detector; and generating means for generating the comparative voltage based on a voltage at a junction between said first resistor and said second resistor.

5. The output driving circuit for use in a DC stabilized power supply circuit as set forth in claim 4, wherein:

said selective transistor is an NPN-type transistor.

6. The output driving circuit for use in a DC stabilized power supply circuit as set forth in claim 1, wherein:

a resistance value of the drive current detection resistor is selected such that the terminal based voltage when detecting the overcurrent is not more than 0.5 V.

7. The output driving circuit for use in a DC stabilized power supply circuit as set forth in claim 5, wherein:

a resistance value of the drive current detection resistor is selected such that the terminal based voltage when detecting an overcurrent is not more than 0.5 V.

8. The output driving circuit for use in a DC stabilized power supply circuit as set forth in claim 1, wherein:

said control means includes a first driving transistor for use in controlling an amount of the drive current flowing therein based on an output of said error amplifier, and said drive current detection resistor and said first driving transistor are directly connected.

9. The output driving circuit for use in a DC stabilized power supply circuit as set forth in claim 8, wherein:

said control means further includes a second driving transistor for controlling said first driving transistor based on an output of said error amplifier, and said short-circuit overcurrent protection means includes:

a first transistor provided between the first driving transistor and said second driving transistor, which is biased by a control current flowing between the both of the driving transistors when a short-circuit is not detected to transmit the control current from one of said both driving transistors to the other driving transistor, a detection transistor which conducts when said feedback voltage is lowered due to an occurrence of a short-circuit and biases the bias current of said first transistor; and a second transistor for increasing an impedance of said detection transistor when seen form a feedback voltage application side.

10. A DC stabilized power supply circuit for stabilizing an input and outputting the input as stabilized, comprising:

an output transistor for controlling a current flowing across an input terminal and an output terminal; and said output driving circuit of claim 1 for controlling said output transistor.

* * * * *